United States Patent [19]

Hofmann et al.

[11] 3,901,663

[45] Aug. 26, 1975

[54] COATING GRAPHITE BODIES WITH METALS

[75] Inventors: Horst Hofmann; Helmut Katz, both of Munich, Germany

[73] Assignee: Siemens Aktiengesellschaft, Berlin & Munich, Germany

[22] Filed: Sept. 10, 1973

[21] Appl. No.: 395,916

[52] U.S. Cl. ............................ 29/195; 117/71 M
[51] Int. Cl. ............................................ B32b 15/04
[58] Field of Search ....... 29/195 C; 117/71 R, 71 M

[56] References Cited
UNITED STATES PATENTS

| | | |
|---|---|---|
| 3,024,522 | 3/1962 | Cacciotti........................... 29/195 |
| 3,476,586 | 11/1969 | Valtchev et al...................... 117/71 |

*Primary Examiner*—L. Dewayne Rutledge
*Assistant Examiner*—E. L. Weise
*Attorney, Agent, or Firm*—Hill, Gross, Simpson, Van Santen, Steadman, Chiara & Simpson

[57] ABSTRACT

A technique for coating graphite bodies with metal layers capable of withstanding thermal loading. The technique is useful on graphite tubular elements, such as electrodes forming a tube wall or portion thereof in electrical discharge vessels. Typically, a rhenium coated graphite body is overcoated with a copper, gold, or silver layer to provide a gas-impermeable composite coating on the graphite body.

6 Claims, 4 Drawing Figures

COATING GRAPHITE BODIES WITH METALS

BACKGROUND OF THE INVENTION

Carbon, particularly in the form of graphite mouldings, has long been utilized by electrical engineers in the tube-building industry, because of its good chemical, electrical, mechanical, and also high temperature properties, particular use having been made of the excellent thermal conductivity of pyrolitic carbon.

For example, from W. Ger. DT OS 1,614,679 and W. Ger. DT OS 1,614,680 it is known, for example, that to build a collector, one can assemble together discs of pyrolitic carbon. Then, to increase surface electrical conductivity, the discs are provided with a dense metal coating, of rhenium, for example, to produce good conduction. To further improve such electrical conductivity, the discs are additionally coated with an additional electrolytically deposited metal layer, of copper, for example. However, by such technique, the metals thus applied, although dense, are only capable of providing a vacuumtight seal if the pyrolitic carbon body itself is vacuumtight.

Since pyrolitic carbon bodies cannot be manufactured in any desired size, there is presently a substantial restriction upon the possible applications of such carbon. It would thus constitute a major advance in the art if the excellent properties which ordinary graphite possesses could be exploited. The field of application for ordinary graphite would also be enhanced if such graphite could be used as a vacuumtight envelope.

BRIEF SUMMARY OF THE INVENTION

The present invention is directed to a technique for producing metal coatings on carbon bodies. These coatings are substantially impermeable to gas and are heat resistant. The so coated bodies are useful as electrodes, especially as components which form a tube wall or part thereof in electrical discharge vessels.

As object of the present invention is to provide an improved method of applying metal coatings to graphite bodies, especially gas inpermeable metal coatings to gas permeable graphite bodies.

Another object of the present invention is to provide a process by which carbon bodies can be coated with metal by a preliminary treatment so as to produce an object which not only has thermal resistance in association with good electrical conductivity, but also is substantially completely impermeable to gas, so that such so coated bodies can be utilized among other things as wall elements in evacuatable vessels.

Another object of the present invention is to provide, using a process as indicated, impermeable metallic coatings which firmly adhere to a graphite substrate and are capable of withstanding thermal loadings.

Another object of this invention is to provide a metal coating process for graphite bodies which leaves substantially no unwanted galvanic bath residues which are difficult to remove.

Another object of this invention is to provide a metal coating process for graphite bodies which leaves substantially no pores of a kind which characteristically develop in galvanic bath processes.

Another object is to provide a metal coating process for graphite bodies wherein a layer of metal is deposited over a layer of rhenium so as to provide a product coating wherein there is no diffusing away of the rhenium layer and wherein there is no carbon enrichment of the rhenium layer because rhenium does not form carbides.

Another object is to provide a metal coating process for a graphite body wherein a layer of metal is deposited over a layer of rhenium which has been applied to such body and wherein such rhenium layer is characterized by having a melting angle of virtually 0° so that metals overcoated on such rhenium layer form a gas-impermeable metal film which can be fused to the rhenium layer in virtually any desired thickness.

Other and further objects, purposes, advantages, utilities, and features will be apparent to those skilled in the art from a reading of the present specification and drawings.

DETAILED DESCRIPTION

Figure 1:
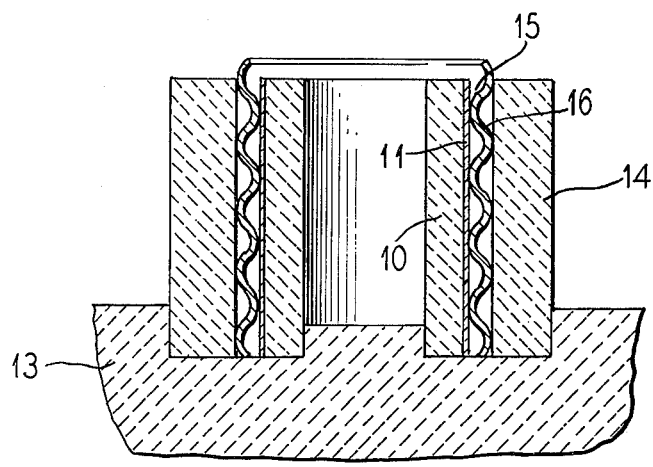
FIG. 1 is a vertical sectional view through one embodiment of apparatus suitable for use in producing metal coated graphite bodies employing a metal foil starting material.

The present invention is directed to a method of applying a gas-impermeable metal coating capable of withstanding thermal loading to a carbon body. The carbon body is adapted to form at least a portion of tubular electrode wall in a gas discharge tube. Typically the carbon body is comprised of gas permeable graphite, but can be comprised of pyrolitic carbon. The method is preferably practiced so as to produce a firmly adhering metal coating. The invention is further directed to the product carbon bodies.

In the practice of this invention, such a carbon body is preferably first coated with a metal layer which does not react with carbon at temperatures up to about 2,000°C and which is wetted by melted metals at temperatures below about 2,000°C. Preferably such a metal layer is rhenium. This metal layer is then overcoated with a metal coating, in accord with the present invention.

A preferred metal coating is comprised of a metal selected from the group consisting of copper, silver, gold, palladium, and platinum, and alloys thereof. These metals do not alloy with a rhenium base layer, so that in a product coated grahpite body of this invention, the exterior metal coating over the rhenium layer cannot dissappear through alloying with the rhenium layer even under operating conditions of high thermal stress.

Tests have shown that although the wetting angle on carbon can be reduced down to values of 0° compared with the pure carbon surface by such devices as the formation of coatings of carbide silicides, borides, etc., these intermediate coatings have the undesirable property that, even at moderate temperatures, they fuse into the carbon substrate. As a consequence, leaks and bursting of the originally thermally adhering metal coating take place under reduced pressure operating conditions. Moreover, there is the fact that metal coatings applied electrolytically to carbon bodies as the conventional metal coating method do not have adequate gas impermeability for use in the walls of evacuated vessels because of the characteristically porous structures so created. The present invention overcomes these disadvantages.

In a preferred form the present invention involves a carbon body first coated with a rhenium layer and then overcoated with a layer of silver, gold, copper, or alloy thereof. The rhenium layer is applied as rhenium oxide which is then reduced to rhenium metal. The overcoated layer is applied through direct deposition of melted metal. Preferred coating procedures are herein described and illustrated. A preferred carbon body is gas-permeable graphite in the form of a cylinder.

In the practice of the present invention one coats predetermined clean surface portions of a preformed graphite body with an organic dispersion of rhenium dioxide to produce a layer of rhenium dioxide on such surface portions. As the carbon body, one can use any preformed carboniferous body upon which it is desired to produce a gas impermeable metal coating, which coating is capable of withstanding a thermal loading. A particularly common article of manufacture upon which the teachings of the present invention are utilized comprises a tube wall or portion thereof in electrical discharge vessels, particularly tubular graphite bodies. Such a body is first coated with rhenium. The coating procedure, as just indicated, utilizes an organic dispersion of rhenium dioxide. Such dispersion may be a true solution or a dispersion of colloidal sized rhenium dioxide particles. Such a dispersion is in an organic liquid. The organic liquid does not have any special characteristics, except that it should be a liquid system which is evaporatable at relatively low temperatures so as to facilitate the removal of solvent after a coating operation when rhenium dioxide is coated upon a carbon body.

Before being coated with rhenium dioxide a carbon body should be cleansed of foreign material. A preliminary cleansing operation is preferred in the practice of the present invention wherein dust is removed and the carbon body is cleaned in a perchloroethylene bath ultrasonically. Thereafter, the carbon body is dried preferably at a reduced pressure and conveniently using a temperature of about 100°C. Any convenient cleansing operation may be employed for purposes of the present invention as those skilled in the art will appreciate.

A cleaned, dried carbon body is then coated with an organic rhenium oxide solution. Any convenient coating system may be employed but a present particularly preferred technique is to simply brush the solution on the surfaces to be coated of the carbon body. After coating a carbon body is conveniently air dried preferably slowly and at room temperatures although any convenient drying procedure may be employed which does not disturb the rhenium coating as those skilled in the art will appreciate.

The dried coating is then exposed to a reducing atmosphere, a convenient reducing temperature ranges from about 700° to 900°C for a time of at least about five minutes in a reducing gaseous atmosphere. A most preferred reducing gas is dried hydrogen, particularly flowing hydrogen moving at a rate of from about 200 to 400 liters per hour. A most preferred flow rate is about 300 liters per hour. Usually it is desirable to repeat the sequence of coating, drying and reducing in order to produce a layer of rhenium of desired thickness upon the carbon body. Usually and preferably the sequence of coating, drying and reducing is conducted and repeated sequentially at least about three times. Typically the thickness of a product layer of rhenium metal ranges from about 0.8 to 2.5 microns in thickness with thicknesses of from about 1 to 2 microns being preferred.

The rhenium coated carbon body is then, preferably in accordance with the teachings of the present invention overcoated with a second metal, as indicated above, such as copper, silver, gold or alloys thereof. The procedure for such a metal overcoating operation is conveniently described in reference to the attached figures. Referring to FIG. 1 there is seen one embodiment of apparatus suitable for use in such a coating operation. Here the rhenium coated carbon body 10 coated on its circumferential outer surfaces with a rhenium layer 11 is in the form of a cylinder of graphite. The rhenium layer 11 is preferably applied by the procedure above described. The body 10 bearing the layer 11 is mounted on a bottom plate 13 of carbon. Circumferentially about body 10 with its layer 11 is positioned a cylinder 14 of carbon, cylinder 14 being generally coaxial with cylinder 10 but having its inside circumferential side walls in spaced relationship to the outer surface of the layer 11 so as to leave a gap 15 between layer 11 and the inside wall of cylinder 14. The radial thickness of the gap 15 is in the range of from about 150 to 250 microns.

In FIG. 1, the gap 15 contains a metal foil 16 which has been wrapped preliminarily about layer 11, usually before the body 10 has been mounted on the plate 13, typically and preferably the foil 16 has been crimped or crinkled. Typical metal foil for use in the present invention have thicknesses not greater than about 0.005 inch and the foil is comprised of copper, silver, gold and alloys thereof.

The assembly with the foil mounted between the cylinder 14 and the layer 11 is now heated preferably in an inert atmosphere, conveniently one in which substmospheric pressures are maintained. The heating is conducted at a temperature above the melting point of foil usually for a time of at least about five minutes, but at any rate for a time sufficient to melt the metal foil. In a melted condition, the metal of the former foil wets only the surface of layer 11. The surface of the cylinder 14 is practically not wetted by the melted metal. Thereafter the entire system is cooled though starting at about 300°C, the cooling is conducted in an inert atmosphere. A gas impermeable metal coating is thus formed over the rhenium layer, which coating is not designated and not illustrated in FIG. 1 or FIG. 2. The metal coated on the rhenium layer 11 does not alloy therewith so the layer 11 serves as an intermediate layer. The relationship between the rhenium layer 11 and the starting foil 16 is seen in FIG. 2.

Figure 3:
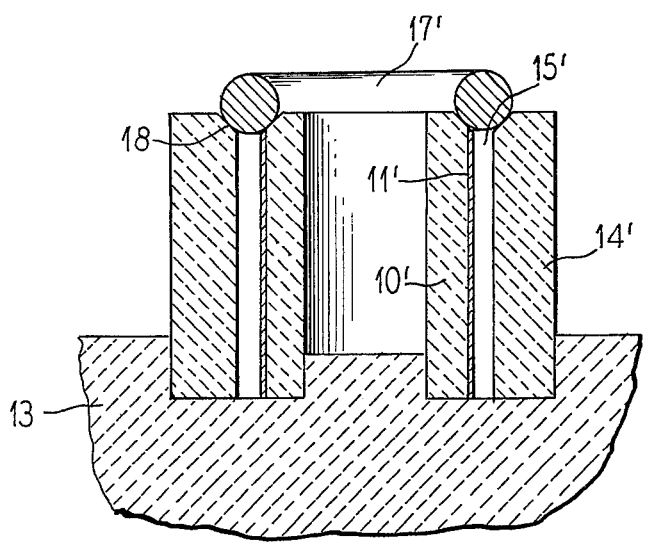
FIG. 3 is a view similar to FIG. 1 but employing a metal ring starting material.

The apparatus illustrated in FIG. 3 is similar to that shown in FIG. 1. Similar parts are similarly numbered but with the addition of prime marks thereto. In FIG. 3 in place of the foil 16 there is employed a loop 17 of coating metal. The loop 17 is conveniently located in a slightly chamfered groove 18 located over the spacing 15 and formed in the adjacent edges of each of the cylinder 14 and the body 10. After the loop 17 is melted, as in the case of operation of the apparatus of FIG. 1, the metal overcoated rhenium undercoated body 10 is allowed to cool as before. Cooling can be conducted in an inert current as those skilled in the art will appreciate.

Figure 2:
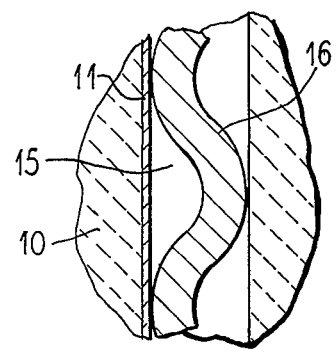
FIG. 2 is an enlarged, fragmentary, detail view taken in the region II—II of FIG. 1.
Figure 4:
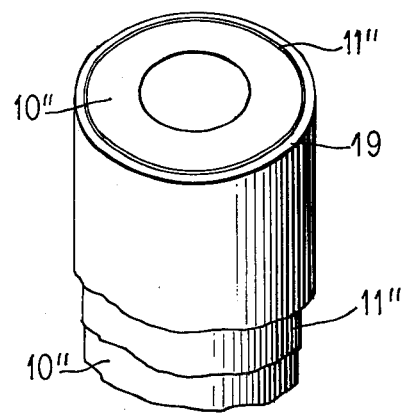
FIG. 4 is an isometric view of a metal coated graphite body produced using the apparatus of either FIG. 1 or FIG. 2, some parts thereof broken away.

The nature of a metal coated body produced in accordance with the teachings of either FIGS. 1 and 2 or FIG. 3 is illustrated in FIG. 4. Here a cylinder 10'' bears a layer 11'' of rhenium layer 11'' has been overcoated with metal layer 19 comprised of silver, copper, gold or alloy thereof as indicated above. The layer 19 ranges in thickness from about 150 to 250 μm (microns).

EMBODIMENTS

The present invention is further illustrated by reference to the following Example. Those skilled in the art will appreciate that other and further embodiments are obvious and within the spirit and scope of this invention from the teachings of this present Example taken with the accompanying specification and drawings.

EXAMPLE

Part A

A solution of rhenium dioxide is prepared by dissolving one gram of such oxide in four milliliters of a mixture which comprises volumetrically two parts of acetoacetic acid ethyl ester ($C_6H_{10}O_3$), two parts of 2,4- acetylacetone ($CH_3COCH_2COCH_3$), 5 parts methanol, and 1 part ethanol.

A cylinder of graphite is dusted and then cleansed in an ultrasonic bath of perchloroethylene, after which the resulting carbon body is dried under subatmospheric pressure at about 100°C.

Next, the so-dried body is coated by brushing with the solution of rhenium oxide above described. Several successive coatings of such solution are applied to the carbon body which tends to absorb the solution rather strongly. Each coating is allowed to continuously dry slowly between successive coating operations. To assure even drying, the body is slowly rotated during drying. Successive coating operations are continued (in this case, three coatins are applied) until the so-called carbon body has a barely perceptible dry film on the coated surfaces thereof after drying.

The so-coated dried body is then placed in an oven through which a current of about 300 liters per hour of dry hydrogen is flowing. The interior oven temperature is maintained at about 800° plus or minus 100°C. The carbon body is maintained in this oven for about an hour, which is sufficient time to reduce the rhenium dioxide to rhenium metal.

Thereafter, the body is again coated with the above described rhenium solution in the manner above described, and, after drying, as above described, the resulting recoated body is again placed in the flowing dry hydrogen furnace under the same conditions as above described for a similar time.

The sequence of coating, drying and reducing is repeated (in this case 5 times) until a visible grey surface layer of rhenium metal, which is about one to two microns thick, has been produced.

Part B

The rhenium coated body of Part A is wrapped with a single layer of crumpled copper foil having a thickness of about 50 microns.

Thereafter so-wrapped body is inserted coaxially into a graphite cylinder mounted on a base in the manner as described above in reference to FIG. 1. The spacing between the rhenium surface and the adjacent inner circumferential wall of the graphite cylinder is about 200 microns.

The entire resulting apparatus configuration is then positioned in an oven having an inner atmosphere maintained at a subatmospheric pressure using a temperature of about 1500°C (the melting point of copper is 1,083°C; the boiling point is 2,310°C; the melting point of rhenium is 3,167°C). The configuration is maintained in the furnace until the foil metal is melted. The melted copper flown over the surface of the rhenium which is wet by liquid copper, but very little of the copper adheres to the adjacent graphite wall, since the carbon is practically unwetable by molten carbon. Residence time in the oven is estimated to be about 45 minutes to an hour and a half.

Thereafter the product assembly is cooled in an inert atmosphere starting at 300°C.

After the opposed ends of the product so-coated, cylinder are machined to dimensions, the cylinder is ready for use as a gas impermeable electrode forming a tube wall in an electrical discharge vessel and has excellent heat exposure properties.

Part C

The rhenium coated body of part A is inserted coaxially into a graphite cylinder mounted in a base in the manner shown in FIG. 2. The spacing between the rhenium layer surface and adjacent circumferential wall of the graphite cylinder is about 200 microns. A toroidally shaped ring of silver is set over the top of the spacing in the groove provided.

The heating procedure of Part B is repeated except that the temperature used is about 1,200°C. After the silver toroid melts and the molten silver has flowed over the surface of the rhenium, the cooling procedure of Part B is followed. The cylinder produced is suitable for use as a gas impermeable, heat resistant electrode.

We claims:

1. A carbon body having, on at least a portion of the surface thereof, a gas-impermeable metal coating comprising A. a graphite member,
   B. a first layer of rhenium metal ranging in thickness from about 0.8 to 2.5 microns over at least a portion of the surface of said member and bonded thereto, and
   C. a second layer of a metal selected from the group consisting of copper, silver, gold, and alloys thereof ranging in thickness from about 150 to 250 microns, said second layer being gas impermeable and deposited over said first layer.

2. The carbon body of claim 1 wherein said second layer comprises copper.

3. The carbon body of claim 1 wherein said second layer comprises silver.

4. The carbon body of claim 1 wherein said second layer comprises gold.

5. The carbon body of claim 1 wherein said graphite member is cylindrical in shape.

6. The carbon body of claim 5 wherein said first layer and said second layer are located on circumferential, outer surfaces thereof.

* * * * *